(12) United States Patent
Keeble (10) Patent No.: US 11,787,007 B2
(45) Date of Patent: Oct. 17, 2023

(54) METHODS AND APPARATUS TO CONTROL A FLUID DISPENSER ON A METALLURGICAL SPECIMEN PREPARATION MACHINE

(71) Applicant: Illinois Tool Works Inc., Glenview, IL (US)

(72) Inventor: Michael E. Keeble, Libertyville, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1099 days.

(21) Appl. No.: 16/445,676

(22) Filed: Jun. 19, 2019

(65) Prior Publication Data
US 2019/0389032 A1 Dec. 26, 2019

Related U.S. Application Data

(60) Provisional application No. 62/688,293, filed on Jun. 21, 2018.

(51) Int. Cl.
*B24B 37/015* (2012.01)
*B24B 55/03* (2006.01)
(Continued)

(52) U.S. Cl.
CPC ............ *B24B 37/015* (2013.01); *B24B 55/03* (2013.01); *B24B 37/04* (2013.01); *G01N 1/286* (2013.01); *G01N 2001/2866* (2013.01)

(58) Field of Classification Search
CPC ....... B24B 37/015; B24B 37/04; B24B 55/03; G01N 1/286; G01N 2001/2866
(Continued)

(56) References Cited

U.S. PATENT DOCUMENTS

| 4,678,119 A | 7/1987 | Doyle |
| 5,722,875 A * | 3/1998 | Iwashita ................. B24B 49/02 451/8 |

(Continued)

FOREIGN PATENT DOCUMENTS

| CN | 207448235 | 6/2018 |
| EP | 1052061 | 11/2000 |

(Continued)

OTHER PUBLICATIONS

Int'l Search Report and Written Opinion Appln No. PCT/US2019/038234 dated Oct. 31, 2019 (13 pgs).

(Continued)

*Primary Examiner* — Omar Flores Sanchez
(74) *Attorney, Agent, or Firm* — McAndrews, Held & Malloy, Ltd.

(57) ABSTRACT

Methods and apparatus to control a fluid dispenser on a metallurgical specimen preparation machine are disclosed. An example system to dispense fluid for a grinder/polisher includes: a fluid dispenser having: a fluid reservoir to store a fluid, and a nozzle configured to dispense the fluid onto a grinding/polishing surface; a temperature sensor configured to output a temperature signal indicative of a temperature of the grinding/polishing surface during a grinding or polishing operation; and a processor configured to: compare the temperature signal to a threshold; and send a dispense signal to the fluid dispenser when the temperature signal satisfies the predetermined threshold, wherein the fluid dispense is configured to dispense the fluid in response to the dispense signal.

19 Claims, 8 Drawing Sheets

(51) Int. Cl.
  *B24B 37/04* (2012.01)
  *G01N 1/28* (2006.01)
(58) Field of Classification Search
  USPC .............................................................. 451/7
  See application file for complete search history.

(56) References Cited

U.S. PATENT DOCUMENTS

| | | | |
|---|---|---|---|
| 5,916,012 A | 6/1999 | Pant | |
| 6,012,967 A | 1/2000 | Satake | |
| 6,315,635 B1* | 11/2001 | Lin | B24B 57/02 |
| | | | 451/7 |
| 6,893,321 B1* | 5/2005 | Buchanan | B24B 57/02 |
| | | | 451/41 |
| 7,070,067 B1 | 7/2006 | Buchanan | |
| 8,574,028 B2 | 11/2013 | Shewey | |
| 9,180,571 B2 | 11/2015 | Hart | |
| 2003/0119429 A1* | 6/2003 | Bright | B24B 37/30 |
| | | | 451/67 |
| 2008/0004743 A1* | 1/2008 | Goers | B24B 53/017 |
| | | | 700/121 |
| 2010/0203806 A1* | 8/2010 | Kitakura | B24B 37/015 |
| | | | 451/6 |
| 2012/0190273 A1* | 7/2012 | Ono | B24B 37/10 |
| | | | 451/5 |
| 2012/0220196 A1* | 8/2012 | Maruyama | B24B 37/04 |
| | | | 451/7 |
| 2013/0052917 A1* | 2/2013 | Park | B24B 37/015 |
| | | | 451/526 |
| 2014/0004626 A1* | 1/2014 | Xu | B24B 37/015 |
| | | | 257/E21.528 |
| 2014/0020829 A1* | 1/2014 | Chen | B24B 37/015 |
| | | | 156/345.13 |
| 2015/0079881 A1* | 3/2015 | Maruyama | B24B 49/14 |
| | | | 451/259 |
| 2019/0054590 A1 | 2/2019 | Huang | |
| 2021/0402552 A1* | 12/2021 | Kumar | B24B 37/34 |
| 2022/0266415 A1* | 8/2022 | Shin | B24B 57/02 |

FOREIGN PATENT DOCUMENTS

| | | |
|---|---|---|
| EP | 1175964 | 1/2002 |
| JP | 1998156708 | 6/1998 |
| JP | 2000015561 A | 1/2000 |
| JP | 2012525715 | 10/2012 |
| JP | 2012525715 A | 10/2012 |
| WO | 2017139079 | 8/2017 |

OTHER PUBLICATIONS

Japanese Office Action Appln No. 2020-570896 dated Jan. 26, 2023.

* cited by examiner

FIG. 7

METHODS AND APPARATUS TO CONTROL A FLUID DISPENSER ON A METALLURGICAL SPECIMEN PREPARATION MACHINE

This patent claims priority to U.S. Provisional Patent Application Ser. No. 62/688,293, filed Jun. 21, 2018, entitled "SYSTEM AND METHOD FOR INFRARED MONITORING AND CONTROL OF FLUID DISPENSING UNITS FOR A GRINDER/POLISHER." The entirety of U.S. Provisional Patent Application Ser. No. 62/688,293 is incorporated herein by reference.

BACKGROUND

The present disclosure pertains to methods and apparatus to control a fluid dispenser on a metallurgical specimen preparation machine, such as a grinder/polisher. Fluid dispensers used in conjunction with a grinder, polisher, or the like for preparing the surface of a metallurgical specimen typically comprise an abrasive fluid/slurry reservoir and an actuator, such as a pump, siphon, or source of air, connected with the reservoir to force the fluid/slurry to a nozzle, the nozzle directed to a rotatable platen or lapping wheel of the grinder/polisher machine for use in the preparation of metallurgical specimens.

In the prior art, U.S. Pat. Nos. 9,180,571 and 8,574,028, both entitled "Grinder/Polisher" disclose a metal preparation machine with which a fluid dispenser is used. Fluid dispensers known in the prior art have typically involved manual or burst modes of dispensation of fluids, such as abrasive slurries. In the prior art, U.S. Pat. No. 7,070,067, entitled "Modular fluid-dispensing system" and U.S. Pat. No. 4,678,119, entitled "Abrasive slurry supply system for use in metallographic sample preparation," disclose configurations of manual or burst fluid dispensers. In a manual configuration, fluid is dispensed by a user actuation. In a burst configuration, fluid is dispensed at a pre-determined interval, frequency, or rate.

As can be readily appreciated, a lack of controlling the rate or placement of lubricants and slurries may lead to excessive damage to grinding/polishing surfaces and samples, poor quality of results, variability between operators and wastage of materials. Further, any settings that are used in a burst mode need to be changed to suit each surface, sample type, number of samples and lubricant/slurry combination used.

Accordingly, there exists a need for an active feedback control of a fluid dispenser, offering both quality and efficiency improvements in metallurgical specimen preparation.

SUMMARY

In view of the above, the present disclosure involves a system and method for infrared monitoring and control of fluid dispensers for a grinder/polisher. A grinder/polisher with an active feedback of fluid dispensing rate improves quality of sample preparation and efficiency of the grinder/polisher. A temperature sensor with at least one infrared sensor detects a temperature of a grinding/polishing surface of the grinder/polisher. The temperature sensor may be attached to the grinder/polisher or a separate temperature sensing arm extending from either a base or a head of the grinder/polisher.

The temperature sensor detects and monitors the temperature of the grinding/polishing surface during operation of the grinder/polisher. A temperature signal is sent from the temperature sensor to a processor (for example, but not limited to, a processor of the fluid dispenser or the grinder/polisher). The processor determines whether a temperature change has occurred on the grinding/polishing surface. In some embodiments, the processor compares the temperature signal from the temperature sensor to a predetermined threshold such as, but not limited to, a maximum temperature, a temperature range, or a temperature change rate.

Based on the determination and/or comparison, the processor sends a dispense signal to the fluid dispenser, which dispenses a fluid from a reservoir through a nozzle unto the grinding/polishing surface. Thus, abrasive and/or lubricant fluid is applied to the grinding/polishing surface as needed, providing adequate lubrication to protect the grinder/polisher and sample without overuse of the fluid.

These and other features and advantages of the present disclosure will be apparent from the following detailed description, in conjunction with the appended claims.

BRIEF DESCRIPTION OF THE DRAWINGS

The benefits and advantages of the present disclosure will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Preferred examples of the present disclosure may be described hereinbelow with reference to the accompanying drawings. In the following description, well-known functions or constructions are not described in detail because they may obscure the disclosure in unnecessary detail.

Grinder/polishers refer to a type of metallurgical specimen preparation machine, and are in use in many industries. Grinder/polishers are often used to prepare samples of metals, polymers, ceramics or the like for further examination, such as by microscopic examination. As used herein, the term grinder/polishers may refer to machines that perform either or both of grinding and polishing. In some examples, whether the grinder/polisher is performing a grinding action or a polishing action may be dependent on the material being prepared, the abrasive being used, and/or the speed of the machine.

In conventional grinder/polishers, fluid is dispensed according to a burst mode or a manual mode of operation. In the manual mode, a user manually activates and deactivates fluid dispensation to either start or stop dispensing fluid. In the burst mode of operation, a memory stores pump-on and pump-off times associated with a qualitative setting selected by a user. Fluid is dispensed according to the pump-on and pump-off times associated with the user-selected setting. As discussed above, conventional techniques for fluid dispensation may suffer from inadequate dispensation, leading to reductions in quality of grinding/polishing results and/or excessive wear on the grinder/polisher components.

Disclosed methods and apparatus perform infrared monitoring and control of fluid dispensers for grinder/polishers. Disclosed examples improve the consistency and/or control of abrasive and/or lubricant fluid dispensing, improve the preparation rate and/or quality of metallographic samples, improve the usage efficiency of consumable fluids (thereby resulting in less waste), reduce or prevent of damage to grinding/polishing surfaces caused by inadequate lubrication, and/or increase the level of automation within metallographic preparation, which may improve quality and/or reproducibility of preparation, testing, and analysis processes.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein, the terms "e.g.," and "for example" set off lists of one or more non-limiting examples, instances, or illustrations.

Disclosed systems to dispense fluid for a grinder/polisher include: a fluid dispenser having: a fluid reservoir to store a fluid, and a nozzle configured to dispense the fluid onto a grinding/polishing surface; a temperature sensor configured to output a temperature signal indicative of a temperature of the grinding/polishing surface during a grinding or polishing operation; and a processor configured to: compare the temperature signal to a threshold; and send a dispense signal to the fluid dispenser when the temperature signal satisfies the threshold, wherein the fluid dispenser is configured to dispense the fluid in response to the dispense signal.

In some examples, the temperature sensor is a non-contact temperature sensor. In some examples, the non-contact temperature sensor is at least one of an infrared sensor or a thermographic camera. In some examples, the temperature sensor is configured to measure the temperature of the grinding/polishing surface at multiple locations on the grinding-polishing surface. In some examples, the temperature sensor is configured to output the temperature signal to represent a highest temperature measured among the multiple locations at a same time. In some example systems, the temperature sensor is configured to output the temperature signal to represent an average temperature of the multiple locations.

In some examples, the fluid dispenser is configured to output a predetermined quantity of the fluid in response to the dispense signal. In some examples, the fluid dispenser is configured to output a quantity of the fluid based on a value of the dispense signal. In some examples, the processor is configured to compare a change in the temperature to a threshold change, and to output the dispense signal in response to the change in the temperature satisfying the threshold change.

In some examples, the fluid dispenser include multiple fluid reservoirs, and the fluid dispenser is configure to dispense the fluid based on at least one of a type of grinding or polishing operation, a material of the grinding/polishing surface, or a material of a sample being prepared via the grinding/polishing surface. In some examples, the processor is configured to determine the threshold based on a reference temperature. In some examples, the reference temperature includes a temperature of the grinding/polishing surface measured prior to the grinding or polishing operation or in response to initiation of the grinding or polishing operation.

Disclosed example grinder/polishers include: a platen configured to perform grinding or polishing on a material sample; a fluid dispenser, having a fluid reservoir to store a fluid, and a nozzle configured to dispense the fluid onto a grinding/polishing surface of the platen; a temperature sensor configured to output a temperature signal indicative of a temperature of the grinding/polishing surface; and a processor configured to: compare the temperature signal to a threshold; and send a dispense signal to the fluid dispenser when the temperature signal is greater than or equal to the predetermined threshold.

In some examples, the temperature sensor is a non-contact temperature sensor. In some examples, the non-contact temperature sensor is at least one of an infrared sensor or a thermographic camera. In some examples, the temperature sensor is configured to measure the temperature of the grinding/polishing surface at multiple locations on the grinding-polishing surface. In some examples, the temperature sensor is configured to output the temperature signal to represent a highest temperature measured among the multiple locations at a same time. In some example systems, the temperature sensor is configured to output the temperature signal to represent an average temperature of the multiple locations.

In some examples, the fluid dispenser is configured to output a predetermined quantity of the fluid in response to the dispense signal. In some examples, the fluid dispenser is configured to output a quantity of the fluid based on a value of the dispense signal. In some examples, the processor is configured to compare a change in the temperature to a threshold change, and to output the dispense signal in response to the change in the temperature satisfying the threshold change.

In some examples, the fluid dispenser include multiple fluid reservoirs, and the fluid dispenser is configure to dispense the fluid based on at least one of a type of grinding or polishing operation, a material of the grinding/polishing surface, or a material of a sample being prepared via the grinding/polishing surface. In some examples, the processor is configured to determine the threshold based on a reference temperature. In some examples, the reference temperature includes a temperature of the grinding/polishing surface measured prior to the grinding or polishing operation or in response to initiation of the grinding or polishing operation.

Disclosed example methods for controlling a fluid dispenser include: monitoring, using a temperature sensor, a temperature of a grinding/polishing surface; comparing, at the control unit, the temperature to a threshold temperature; sending a dispense unit from the control unit to the fluid dispenser when the temperature signal is greater than or equal to the predetermined threshold; and dispensing, using a nozzle connected to at least one fluid reservoir of the fluid dispenser, a fluid onto the grinding/polishing surface.

Figure 1:
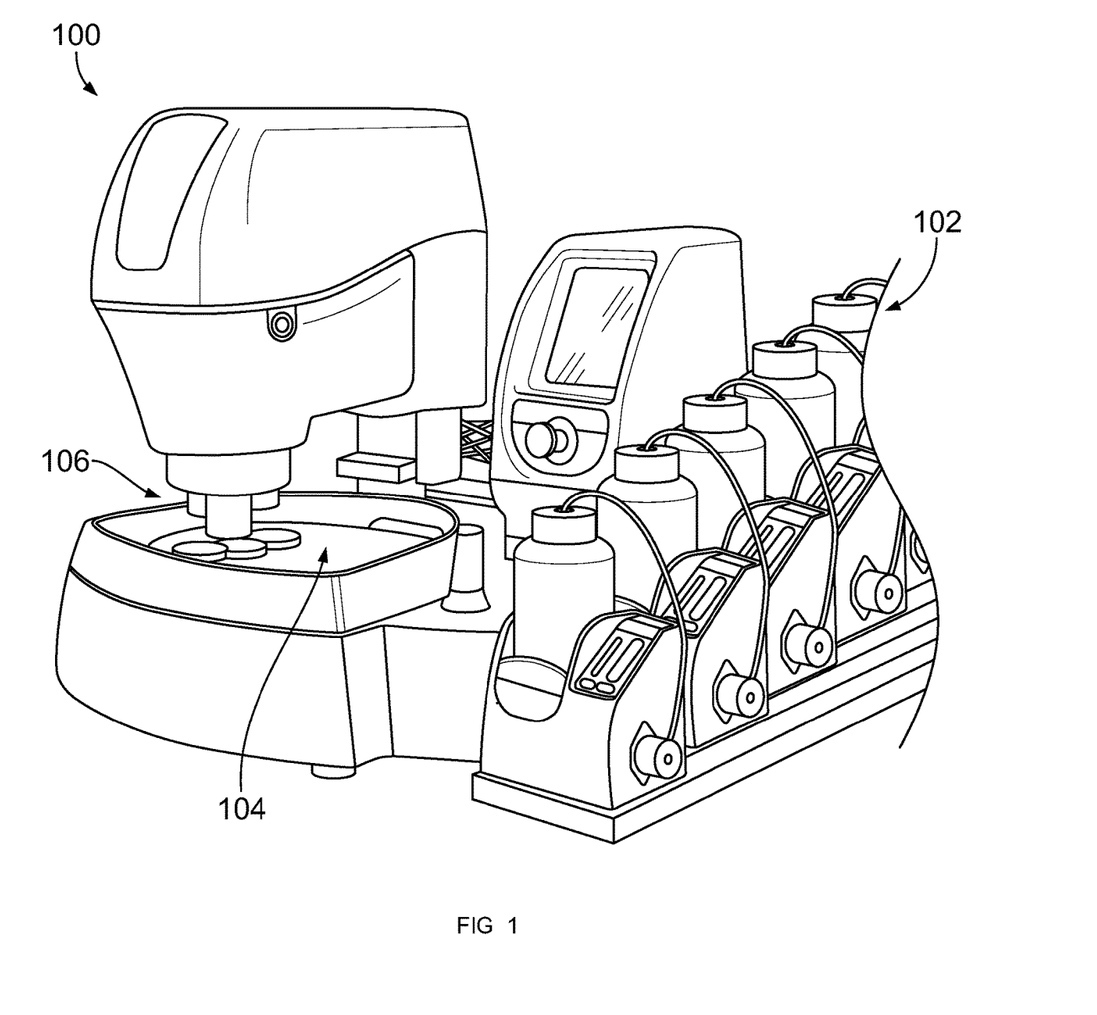
FIG. 1 illustrates an example grinder/polisher including fluid dispensers, in accordance with aspects of this disclosure.

FIG. 1 illustrates an example grinder/polisher 100 including multiple fluid dispensers 102. The grinder/polisher 100 includes a platen 104. The platen 104 is rotated while the material to be ground/polished is placed inside a sample holder 106 and held against the platen 104, which may be provided with an grinding/polishing surface, with controlled force. In some examples, both the platen 104 and sample holder 106 rotate during sample preparation. In this manner, there are two rotating motions occurring simultaneously.

A slurry, which may include abrasive particles, is injected onto the platen 104 to provide an abrasive and/or lubricating medium for grinding or polishing of the specimen. The surface of the platen 104 is interchangeable between a variety of grinding or polishing surfaces. Example grinding and polishing surfaces include, but are not limited to, diamond grinding discs, polishing cloths, and abrasive lapping discs and/or films.

Figure 2:
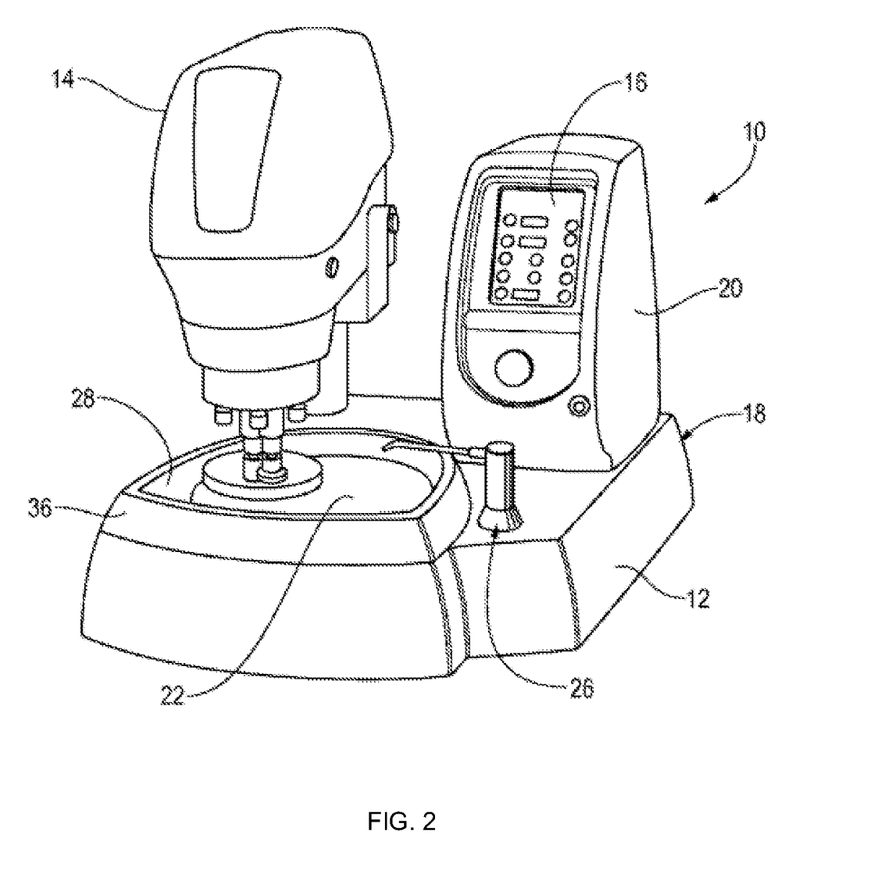
FIG. 2 illustrates an example implementation of the grinder/polisher of FIG. 1.

FIG. 2 illustrates an example grinder/polisher that may be used to implement the grinder/polisher 100 of FIG. 1. The grinder/polisher 10 includes, generally, a base 12, a head 14 and a control panel 16. The base 12 houses a platen 22 and fluid supply and rinse components 26. The base 12 also houses a collection bowl 28 in which the fluid is collected, as well as debris that is generated during grinding/polishing. A splash guard 36 extends up from a casing 18 of the base, surrounding the bowl 28. The example platen 22 is driven by a belt from a platen drive, but may be driven using other techniques. The platen 22 is configured to rotate typically from between 10 revolutions per minute (rpm) and about 500 rpm. In some examples, a high torque motor is used to assure substantially constant platen 22 speed and torque, regardless of the applied load.

During grinding processes, it is desirable to lubricate the surface to control friction/heat generation and to remove ground material. During polishing processes, abrasive and/or lubricant is added to the polishing surface during the process to lubricate, control friction/heat and to retain a high concentration of abrasive particles. The abrasive and/or lubricant is supplied by at least one fluid dispenser (illustrated in FIGS. 1 and 3), which may be built into the grinder/polisher or implemented separately. In some examples, the grinder/polisher 10 may be configured to use multiple fluid dispensers, in which different fluid dispensers may store and dispense the same or different fluid types. Examples of fluids that may be stored and dispensed include, but are not limited to, diamond, alumina (Al2O3), silicon carbide (SiC), silicon dioxide (SiO2), and/or other abrasive suspensions, lubricants, and the like.

Figure 3:
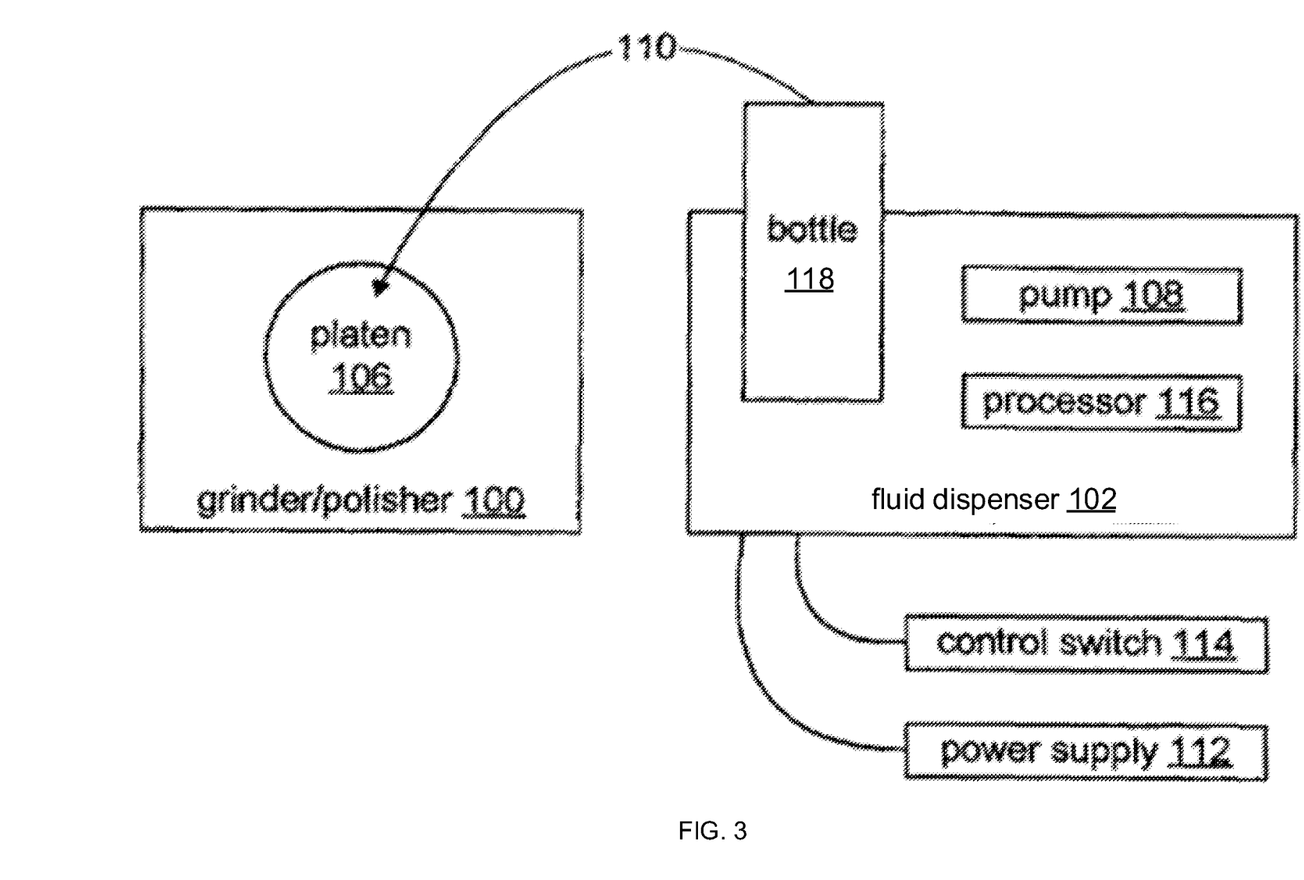
FIG. 3 is a block diagram of an example implementation of the grinder/polisher and fluid dispensers of FIG. 1.

FIG. 3 is a block diagram of an example implementation of the grinder/polisher 100 and fluid dispensers 102 of FIG. 1. A tube/nozzle 110 provides fluid from a bottle 118 of the fluid dispenser 102 to a platen 104 of the grinder/polisher 100. In some examples, the fluid dispenser 102 includes a pump 108 that draws fluid from the bottle 118 and pumps the fluid through the tube/nozzle 110 to the platen 104. The pump 108 may be, for example, a peristaltic pump. A power supply 112 provides power to the system. An example power supply may include a 12-volt DC transformer that is plugged into a regular 120 Volts AC electrical outlet or any other voltage.

The example grinder/polisher 100 of FIG. 3 includes a control switch 114 and a processor 116. The example processor 116 be may include a microprocessor, a microcontroller, a digital signal processor, an application-specific integrated circuit (ASIC), a programmable gate array (e.g., an FPGA, etc.), and/or any other type of analog and/or digital circuitry.

With the conventional manual mode of operation of prior art fluid dispensers, a user is required to monitor the grinder/polisher. Untrained users may underuse abrasive and/or lubricant fluid, causing damage to a surface of the grinder/polisher and/or ruining the sample, or overuse abrasive and/or lubricant fluid, causing overuse of fluid and additional costs per each sample preparation. With the burst mode of operation of prior art fluid dispensers, a user must have correct knowledge of the sample being prepared, grinder/polisher settings, and available abrasive surfaces and dispensable fluids. Set-up can take several minutes or be done incorrectly, causing wasted fluid and machine time. Furthermore, the burst mode only dispenses fluid at a fixed rate or frequency, for example, drip-feeding fluid to the surface at a set rate. The composition of the sample may require a change in the fluid rate needed to properly grind and polish the sample.

Figure 4:
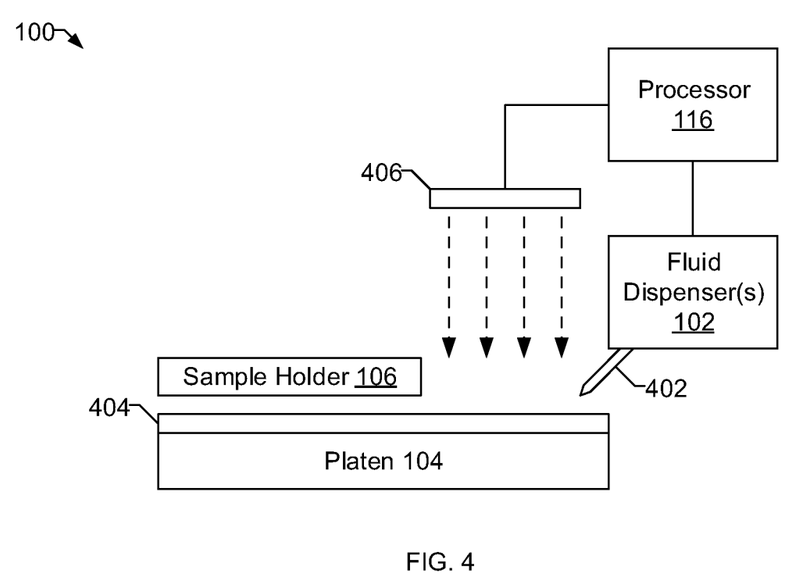
FIG. 4 is a schematic view of the operation of the example grinder/polisher and fluid dispensers of FIG. 1.

FIG. 4 is a schematic view of the operation of the example grinder/polisher 100 and an example one of the fluid dispensers 102 of FIG. 1. A nozzle 402 from the fluid dispenser 102 deposits abrasive and/or lubricant fluids onto an interchangeable grinding/polishing surface 404 mounted to the rotating platen 104. The abrasive and/or lubricant fluids pass between the grinding/polishing surface 404 and the sample holder 106, providing abrasion and/or lubrication.

Figure 5A:
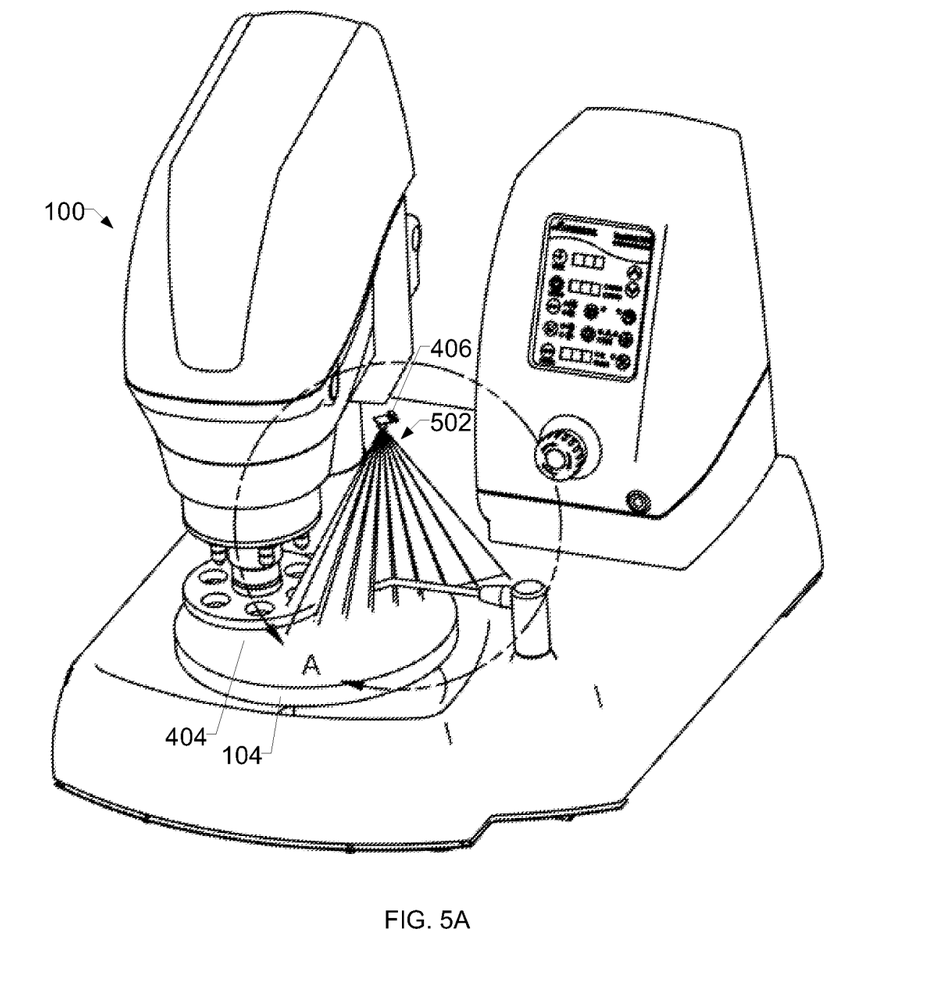
FIG. 5A illustrates the example grinder/polisher of FIG. 1 with a temperature sensor and corresponding field of view.
Figure 5B:
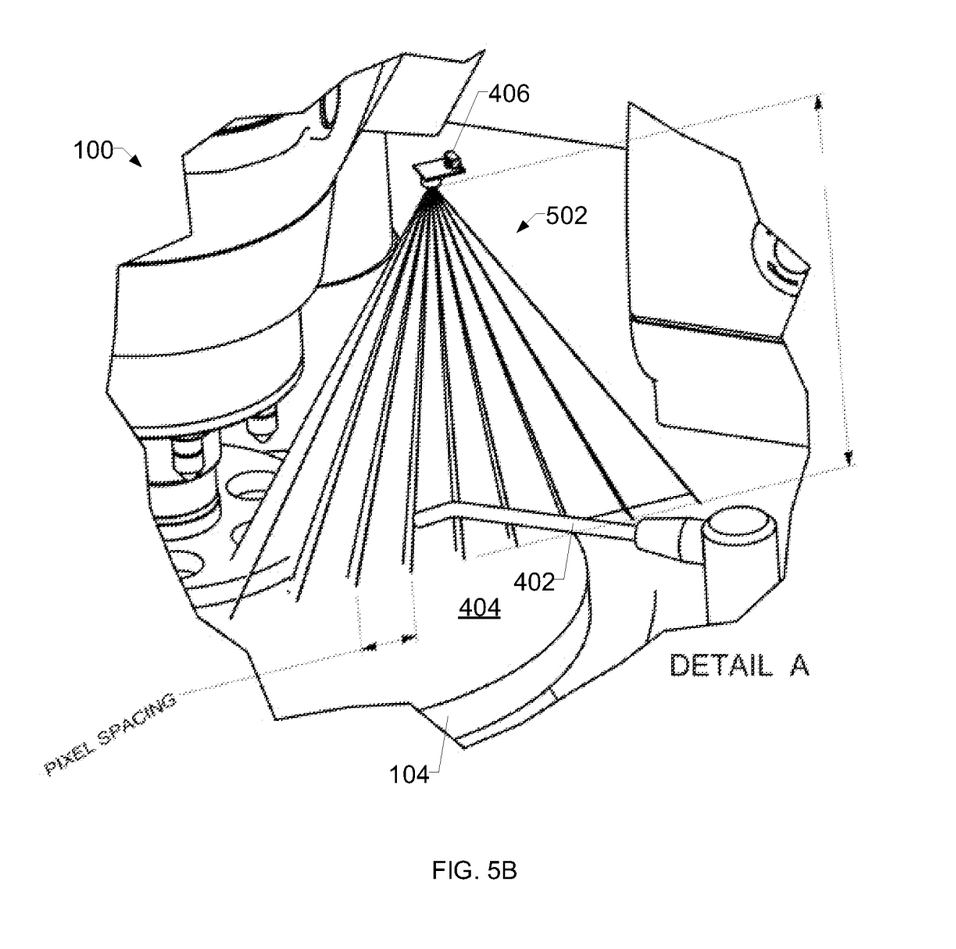
FIG. 5B is a more detailed view of the example temperature sensor and field of view depicted in FIG. 5A.

Above the rotating plate and holder, a temperature sensor 406, such as an infrared (IR) sensor, monitors a temperature of the grinding/polishing surface 404 on the platen 104. In some examples, the temperature sensor 406 includes a thermographic camera. FIG. 5A illustrates the example grinder/polisher 100 of FIG. 1 including the example temperature sensor 406 having a corresponding field of view 502. FIG. 5B is a more detailed view of the example temperature sensor 406 and field of view 502 depicted in FIG. 5A. As illustrated in FIGS. 5A and 5B, the temperature sensor 406 functions as a non-contact thermometer which measures infrared radiation exchange between its radiation detector and its target, the grinding/polishing surface 404. The temperature sensor 406 detects the wavelength of the infrared radiation emitted by the grinding/polishing surface 404, and outputs electrical signal(s) representative of the sensed temperature(s) to the processor 116. Other contact and/or non-contact temperature sensor technologies may be used to implement the temperature sensor 406.

The processor 116 receives the temperature signal(s) indicative of the temperature of the grinding/polishing surface 404 from the temperature sensor 406. When the temperature signal indicates that the at least one IR sensor has detected a temperature change on the grinding/polishing surface 404, the processor 116 sends a dispense signal to the fluid dispenser 102 to release more abrasive and/or lubricant fluid. In some examples, the dispense signal causes the fluid dispenser 102 to output a predetermined quantity of the fluid. Additionally or alternatively, the dispense signal may have a variable value or magnitude, which causes the fluid dispenser 102 to output a corresponding quantity of fluid.

For example, a higher sensed temperature may result in the processor 116 outputting a dispense signal that causes the fluid dispenser 102 to dispense a relatively larger quantity of the fluid. The dispensed fluid generally causes the temperature of the grinding/polishing surface to decrease.

In some examples, the processor 116 and/or the fluid dispenser 102 are rate limited to damp the response to an increased temperature. For example, the processor 116 may limit the number of dispense signals per unit of time, and/or enforce a minimum time between dispense signals, to permit the fluid to provide the cooling effect.

In some examples, the temperature sensor 406 measures a reference temperature prior to operation of the grinder/polisher 100 prior to operation of the grinder/polisher 100 for preparing a metallurgical specimen. In some examples, the reference temperature may be taken at the time the operation is started and/or shortly after the operation begins. The reference temperature may be, for example, a temperature of the grinding/polishing surface 404 prior to operation of the grinder/polisher 100 and/or the ambient room temperature. During operation, friction between the grinding/polishing surface 400 and the specimen causes friction, generating heat. The temperature sensor 406 measures the temperature of the grinding/polishing surface 404 in one or more locations. The temperature sensor 406 may be configured to generate a temperature signal at an example rate every 10 milliseconds of grinder/polisher machine operation, but the rate may be higher or lower. The temperature signal transmitted from the temperature sensor 406 to the processor 116 may be, for example, the measured temperature and/or the difference between the measured temperature and the reference temperature. The target temperature range of a sample preparation cycle depends on the sample type and the grinding/polishing surface.

The example processor 116 is configured to send a dispense signal when the temperature signal (e.g., indicative of the measured temperature of the grinding/polishing surface) is greater than a predetermined threshold (for example, but not limited to, a temperature 2-5° C. greater than the reference temperature). Some temperature change is allowed and expected during grinding/polishing, but rapid temperature change can damage the surface 404 and/or the sample. Thus, the processor 116 sends a dispense signal to the fluid dispenser 102 based on either a measured temperature or a temperature change rate from the temperature sensor 406.

Additionally or alternatively, the processor 116 is configured to send the dispense signal to the fluid dispenser 102 based on a rate of change of the temperature signal and a predetermined threshold. For example, the processor 116 may detect and respond to temperature increases of more than 0.5° C. per second by outputting the dispense signal. Other temperature change rates, such as more than 1° C. per 10 seconds (i.e., 0.1° C. per second) may be used to trigger the processor 116 to output the dispense signal.

In some examples, the processor 116 determines a temperature range along the grinding/polishing surface based on the temperature signal from the temperature sensor 406. If the temperature range is greater than a predetermined threshold, such as a 5° C. variation along the surface, the processor 116 sends a dispense signal.

In the example of FIGS. 5A and 5B, the temperature sensor 406 is positioned above the grinding/polishing surface 404. In some examples, the temperature sensor 406 is attached to a head of the grinder/polisher 100. In some examples, the temperature sensor 406 is attached to a separate temperature sensing arm extending from either a base or a head of the grinder/polisher 100. In the example illustrated in FIGS. 5A-B, the temperature sensor 406 includes eight (8) IR sensors. The IR sensors are arranged in a line and pointed toward the platen 104 and the grinding/polishing surface 404. The platen 104 can be, for example, but not limited to, between 10 and 16 inches in diameter. The example IR sensors monitor a half-diameter line of the platen 104 and/or the surface 404. Because the platen 104 rotates during grinder/polisher machine operation, substantially all of the surface 404 and/or a surface of the platen 104 will be monitored by the temperature sensor 406 with each rotation.

Various configurations of the IR sensor within the temperature sensor 406 are possible. Non-contact temperature sensors (i.e., IR sensors) achieve their sensitivity characteristics over an object view angle using a lens. In some examples, the maximum sensitivity is available over half of the lens field of view. For example, the IR sensors of FIGS. 5A and 5B achieves a sensitivity characteristic over an object view angle by using a silicon lens, and have a field of view (FOV) specified as an area angle of 50% for highest sensitivity.

In FIG. 5B, the temperature sensor 406 is approximately 7-8 inches above the platen 104 of the grinder/polisher 100. The eight IR sensors are configured to detect temperature on a one square inch portion of the platen 104. A different height of the temperature sensor 406 may be used depending on the number of IR sensors and/or diameter of the platen 104. The grinder/polisher 100 may use interchangeable platens 104 of various sizes. In some examples, the temperature sensor 406 is configured to have an adjustable height so that the IR sensors are re-focused based on a size of the platen 104 used with the grinder/polisher 100. The height of the temperature sensor 406 can be adjusted by, for example, moving a temperature sensing arm or sliding the temperature sensor 406 along a portion of the grinder/polisher 100. In some examples, the positioning of at least one of the IR sensor(s) within the temperature sensor 406 is adjusted. The positioning of the at least one IR sensor(s) can be adjusted by, for example, changing an angle or an orientation of the at least one IR sensor.

The temperature sensor 406 is connected to the example processor 116 by, for example, a USB, RS-232 Serial, Profibus, Ethernet, and/or any other communication interface. The temperature signal sent by the temperature sensor 406 to the processor 116 is based on the temperature measurement(s) of the eight IR sensors. In one embodiment, the processor 116 is a separate circuit board dedicated to infrared monitoring and control of the fluid dispenser(s) 102. The separate circuit board may be located in, for example, the head of the grinder/polisher 100, the temperature sensing arm, or the fluid dispenser 102.

Figure 6:
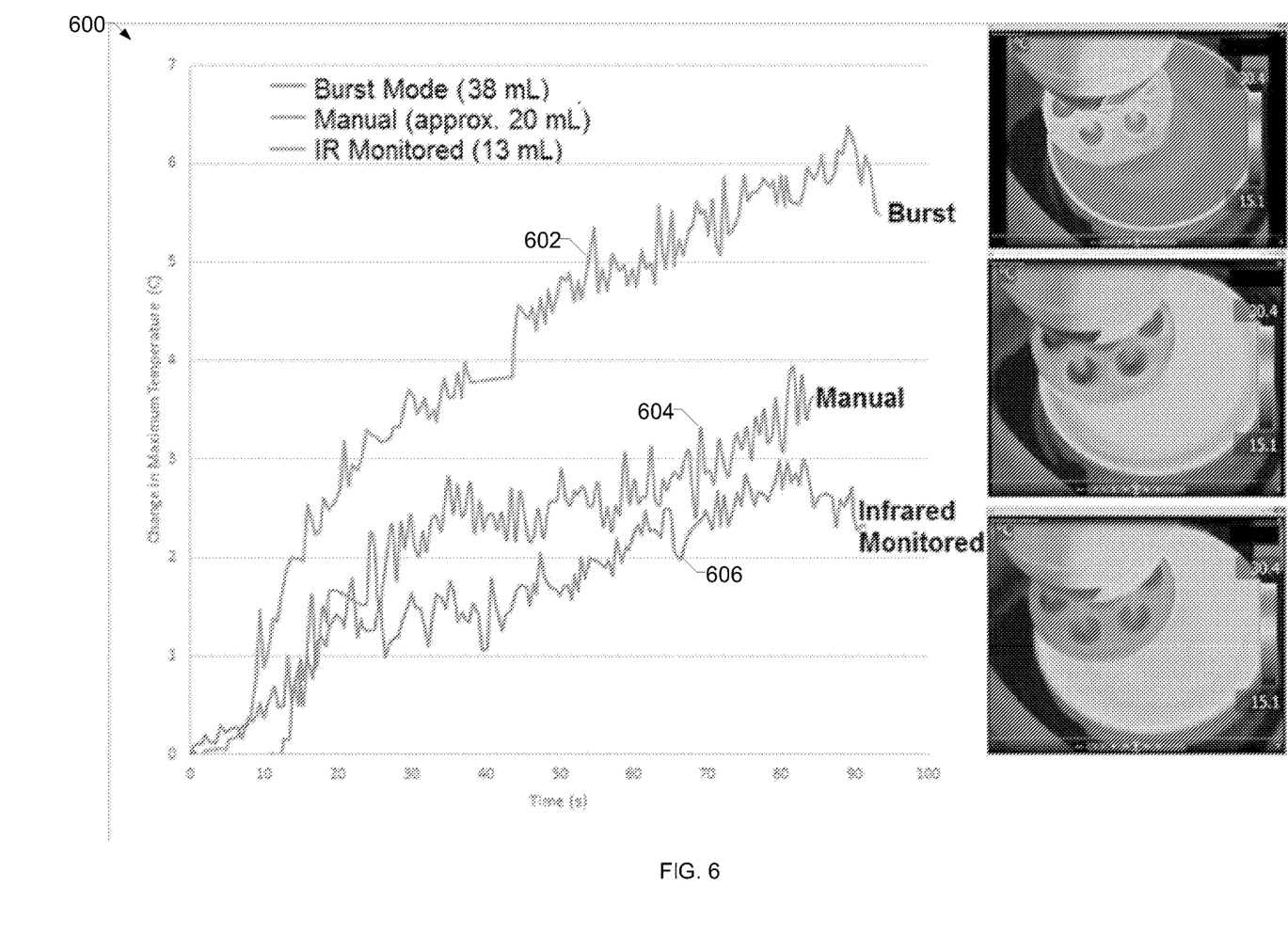
FIG. 6 is a graph of test results comparing platen temperatures using fluid dispensing techniques in accordance with disclosed examples to platen temperatures using prior art techniques.

FIG. 6 is a graph 600 of test results 602, 604, 606 comparing platen temperatures using fluid dispensing techniques in accordance with disclosed examples to platen temperatures using prior art techniques. To obtain the test results 602-606, similar collections of samples were placed in a sample holder for grinding/polishing. Over a 100 second machine operation for each fluid dispensing technique, the change in temperature and amount of fluid used was tracked. The images on the right-hand side were taken by a thermographic camera during testing to examine the process. Hot areas on the grinding/polishing surface are indicative of poor lubrication during sample preparation on the grinder/polisher.

The burst mode of fluid dispensing (shown as results 602), wherein dispensing occurred at a preset interval, used 38 mL of abrasive and/or lubricant fluid, allowing an approximately 6° C. change in maximum temperature on the grinding/polishing surface. The manual mode of fluid dispensing (shown as results 604), wherein fluid dispensing is controlled by a user, used about 20 mL of abrasive and/or lubricant fluid, allowing an approximately 4° C. change in maximum temperature. The IR monitored mode of fluid dispensing, performed in accordance with aspects of this disclosure (shown as results 606), used 13 mL of abrasive and/or lubricant fluid, allowing an approximately 3° C. change in maximum temperature. The at least one infrared sensor of the temperature sensor monitored the grinding/polishing surface temperature to control the fluid dispenser. The IR monitoring disclosed above achieved a lower maximum temperature of the grinding/polishing surface after 100 seconds of use while using less abrasive and/or lubricant fluid.

Figure 7:
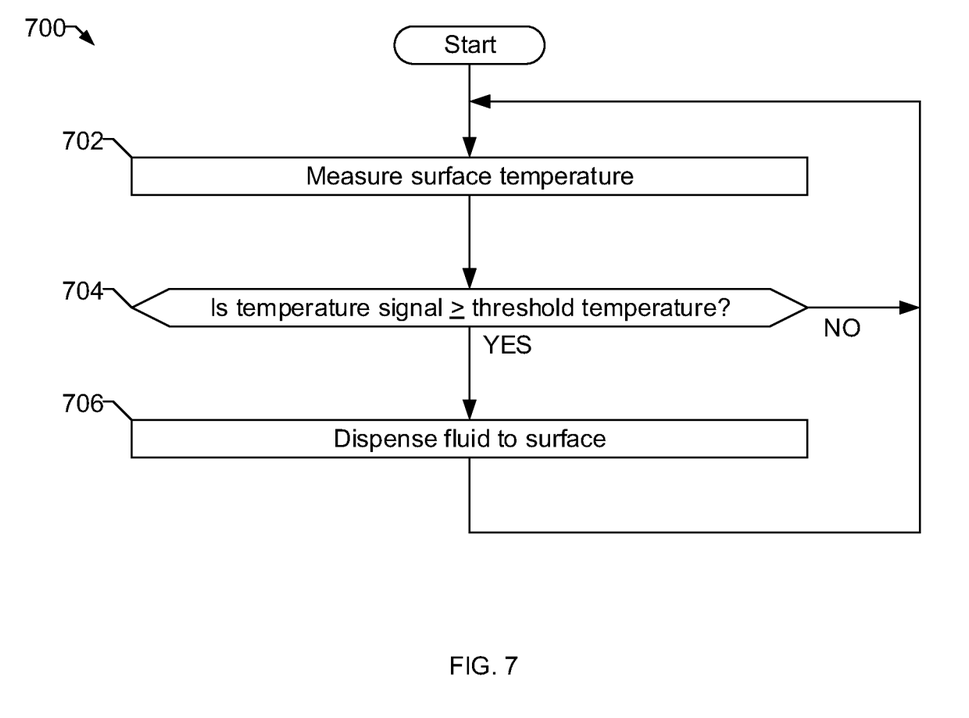
FIG. 7 is a flowchart representative of an example method to control the example fluid dispensers of FIG. 1 to dispense fluid to the grinder/polisher, in accordance with aspects of this disclosure.

FIG. 7 is a flowchart representative of an example method 700 to control the example fluid dispensers 102 of FIG. 1 to dispense fluid to the grinder/polisher 100. The example method 700 may be performed by executing machine readable instructions stored on a non-transitory machine readable medium by the processor 116 and the temperature sensor 406 and/or, more generally, by the grinder/polisher 100. Portions of the example method 700 are capable of being executed simultaneously, in parallel, or in an order that differs from the illustrated serial manner of execution. The method 700 may also be capable of being executed using fewer steps than are shown in the illustrated embodiment.

The method 700 is used to control fluid dispensing during operation of the grinder/polisher. At block 702, the temperature sensor 406 measures the surface temperature of the grinding/polishing surface 404. Signal(s) indicative of temperature(s) of the grinding/polishing surface 404 are transmitted by the temperature sensor 406 to the processor 116. In some examples, the temperature signal transmitted to the processor 116 is the highest temperature of multiple temperatures detected by the temperature sensor 406 at substantially the same time.

At block 704, the processor 116 determines whether the surface temperature satisfies a threshold temperature. In some examples, the processor 116 is configured to send a dispense signal when the measured temperature of the grinding/polishing surface 400 is greater than a predetermined threshold. The predetermined threshold may be, for example, 2-5° C. greater than a reference temperature. The reference temperature may be a temperature of the grinding/polishing surface 404 prior to operation of the grinder/polisher 100 or the ambient room temperature. Various surfaces used with the grinder/polisher 100 may have different predetermined thresholds for use with the fluid dispenser 102.

In some examples, the processor 116 is coupled to a memory storing predetermined thresholds for multiple surfaces. A user may select a grinding/polishing surface being used and a type of specimen being prepared via a user interface (e.g., the control panel 16 of FIG. 2) on the grinder/polisher 100 or the fluid dispenser 102. The selection of surface and specimen type by the user changes the predetermined threshold (e.g., temperature change from ambient temperature) to be used by the processor 116 for comparison of the temperature signal and decision whether to send a dispense signal to the fluid dispenser(s) 102.

In some examples, the processor 116 determines whether a temperature rate of change is greater than a predetermined threshold (for example, but not limited to, 0.5° C. per second) to determine whether to send a dispense signal to the fluid dispenser(s) 102. In some examples, the processor 116 determines a temperature range along the grinding/polishing surface based on the temperature signal from the temperature sensor. If the temperature range is greater than a predetermined threshold (for example, but not limited to, a 5° C. variation along the surface) the processor 116 sends a dispense signal to the fluid dispenser.

Thus, at block 704, the processor 116 is comparing the temperature signal from the temperature sensor 406 to a predetermined threshold related to temperature. In some examples, the processor 116 references one of multiple predetermined thresholds saved in a memory or a look-up table. In other embodiments, more than one predetermined threshold is used to determine whether to send a dispense signal to the fluid dispenser.

If the surface temperature satisfies a threshold temperature (block 704), at block 706 the processor 116 controls the fluid dispenser(s) 102 to dispense fluid to the surface. In some examples, the processor 116 selects one or more of multiple fluid dispenser(s) 102 for dispensing of the fluid, and transmits the dispense signal(s) to the selected dispenser(s) 102. For example, if a temperature change is determined to be greater than or equal to the predetermined threshold the processor 116 sends the dispense signal. The fluid dispenser 102 receives the dispense signal and releases an abrasive and/or lubricant fluid onto the grinding/polishing surface 404. The fluid dispenser 102 activates an actuator, such as a pump, siphon, or source of air, connected with at least one fluid reservoir to force the fluid/slurry to a nozzle, the nozzle directed to the rotating grinding/polishing surface 404.

In some examples, the fluid dispenser 102 releases a pre-set amount of abrasive and/or lubricant fluid upon receiving the dispense signal from the processor 116. The pre-set amount may be stored in a memory, and a user may be able to select a pre-set amount of fluid using a user interface (e.g., the control panel 16 of FIG. 2). For the fluid dispenser 102 to release a second pre-set amount of fluid a subsequent dispense signal is needed from the processor 116. In some examples, the fluid dispenser 102 releases abrasive and/or lubricant fluid until the processor 116 determines the temperature signal from the temperature sensor is less than the predetermined threshold.

The example fluid dispenser(s) 102 may be built into the grinder/polisher or a separate apparatus. In some examples, a plurality of fluid dispensers 102 is used with one grinder/polisher 100, and each fluid dispenser 102 contains a different fluid type. The term fluid includes, but is not limited to, various diamond, alumina (Al2O3), silicon carbide (SiC), silicon dioxide (SiO2), and other abrasive suspensions, lubricants, and the like. Several fluids and surfaces may be used during one sample preparation.

After dispensing the fluid (block 706), or if the temperature signal does not satisfy the threshold (block 704), control returns to block 702 and the temperature sensor 406 continues monitoring the temperature of the grinding/polishing surface and sending the temperature signal to the processor 116. The method 700 may therefore continually monitor the temperature of grinding/polishing surface during operation of the grinder/polisher 100 and dispense the fluid based on the monitored temperatures.

While the present apparatus, systems, and/or methods have been described with reference to certain implementations, it will be understood by those skilled in the art that various changes may be made and equivalents may be substituted without departing from the scope of the present apparatus, systems, and/or methods. In addition, many modifications may be made to adapt a particular situation or material to the teachings of the present disclosure without departing from its scope. Therefore, it is intended that the present apparatus, systems, and/or methods not be limited to the particular implementations disclosed, but that the present apparatus, systems, and/or methods will include all implementations falling within the scope of the appended claims.

What is claimed is:

1. A system to dispense fluid for a grinder/polisher, the system comprising:
   a fluid dispenser comprising:
      a fluid reservoir to store a fluid, and
      a nozzle configured to dispense the fluid onto a grinding/polishing surface;
   a temperature sensor configured to output a temperature signal indicative of a temperature of the grinding/polishing surface during a grinding or polishing operation; and
   a processor configured to:
      compare the temperature to a threshold temperature; and
      send a dispense signal to the fluid dispenser when the temperature is greater than the threshold temperature, wherein the fluid dispenser is configured to dispense the fluid in response to the dispense signal.

2. The system as defined in claim 1, wherein the temperature sensor comprises a non-contact temperature sensor.

3. The system as defined in claim 2, wherein the non-contact temperature sensor is at least one of an infrared sensor or a thermographic camera.

4. The system as defined in claim 1, wherein the temperature sensor is configured to measure the temperature of the grinding/polishing surface at multiple locations on the grinding-polishing surface.

5. The system as defined in claim 4, wherein the temperature sensor is configured to output the temperature signal to represent a highest temperature measured among the multiple locations at a same time.

6. The system as defined in claim 4, wherein the temperature sensor is configured to output the temperature signal to represent an average temperature of the multiple locations.

7. The system as defined in claim 1, wherein the fluid dispenser is configured to output a predetermined quantity of the fluid in response to the dispense signal.

8. The system as defined in claim 1, wherein the fluid dispenser is configured to output a quantity of the fluid based on a value of the dispense signal.

9. The system as defined in claim 1, wherein the processor is configured to compare a change in the temperature to a threshold change, and to output the dispense signal in response to the change in the temperature satisfying the threshold change.

10. A system to dispense fluid for a grinder/polisher, the system comprising:
    a fluid dispenser comprising:
       a fluid reservoir to store a fluid, wherein the fluid dispenser comprises multiple fluid reservoirs, and the fluid dispenser is configured to dispense the fluid based on at least one of a type of grinding or polishing operation, a material of the grinding/polishing surface, or a material of a sample being prepared via the grinding/polishing surface;
       a nozzle configured to dispense the fluid onto a grinding/polishing surface;
    a temperature sensor configured to output a temperature signal indicative of a temperature of the grinding/polishing surface during a grinding or polishing operation; and
    a processor configured to:
       compare the temperature is greater than the to a threshold; and
       send a dispense signal to the fluid dispenser when the temperature the threshold, wherein the fluid dispenser is configured to dispense the fluid in response to the dispense signal.

11. The system as defined in claim 1, wherein the processor is configured to determine the threshold based on a reference temperature.

12. The system as defined in claim 11, wherein the reference temperature comprises a temperature of the grinding/polishing surface measured prior to the grinding or polishing operation or in response to initiation of the grinding or polishing operation.

13. A grinder/polisher, comprising:
    a platen configured to perform grinding or polishing on a material sample;
    a fluid dispenser, comprising:
       a fluid reservoir to store a fluid, and
       a nozzle configured to dispense the fluid onto a grinding/polishing surface of the platen;
    a temperature sensor configured to output a temperature signal indicative of a temperature of the grinding/polishing surface; and
    a processor configured to:
       compare the temperature to a predetermined threshold temperature; and
       send a dispense signal to the fluid dispenser when the temperature signal is greater than or equal to the predetermined threshold temperature.

14. The grinder/polisher as defined in claim 13, wherein the temperature sensor comprises a non-contact temperature sensor.

15. The grinder/polisher as defined in claim 14, wherein the non-contact temperature sensor is at least one of an infrared sensor or a thermographic camera.

16. The grinder/polisher as defined in claim 13, wherein the temperature sensor is configured to measure the temperature of the grinding/polishing surface at multiple locations on the grinding-polishing surface.

17. The grinder/polisher as defined in claim 13, wherein the processor is configured to determine the threshold based on a reference temperature.

18. The grinder/polisher as defined in claim 17, wherein the reference temperature comprises a temperature of the grinding/polishing surface measured prior to the grinding or polishing operation.

19. The grinder/polisher as defined in claim 13, wherein the processor is configured to compare a change in the temperature to a threshold change, and to output the dispense signal in response to the change in the temperature satisfying the threshold change.

* * * * *